April 27, 1965
J. W. THOMPSON ET AL
3,180,015
TOOL FOR INSERTING O-RINGS
Filed Jan. 3, 1963
2 Sheets-Sheet 1
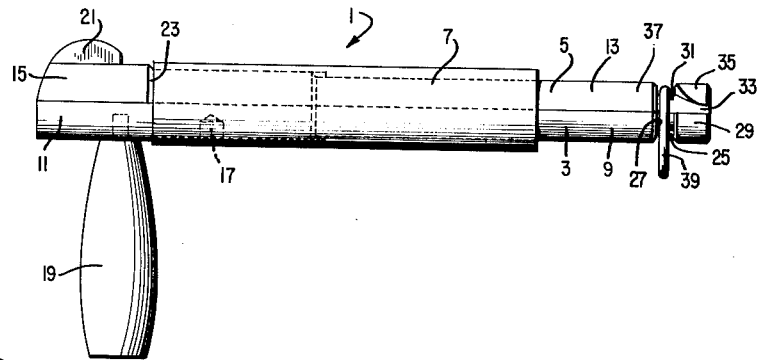
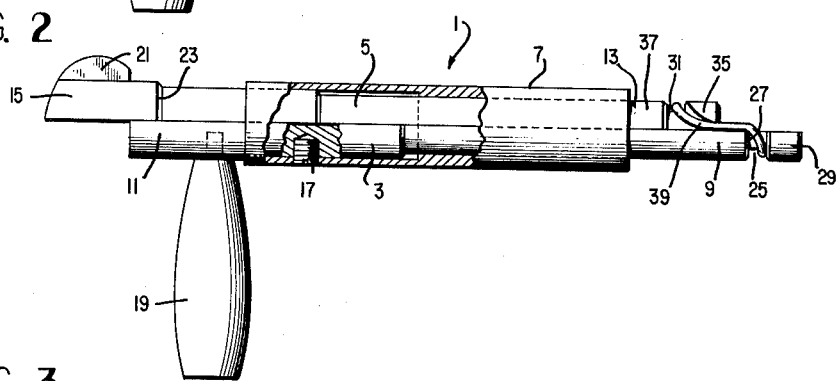
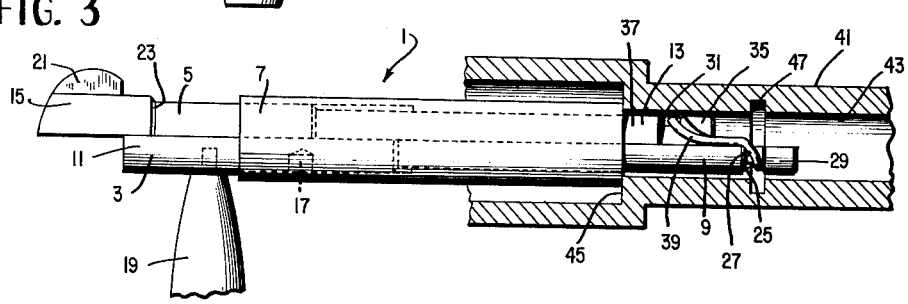
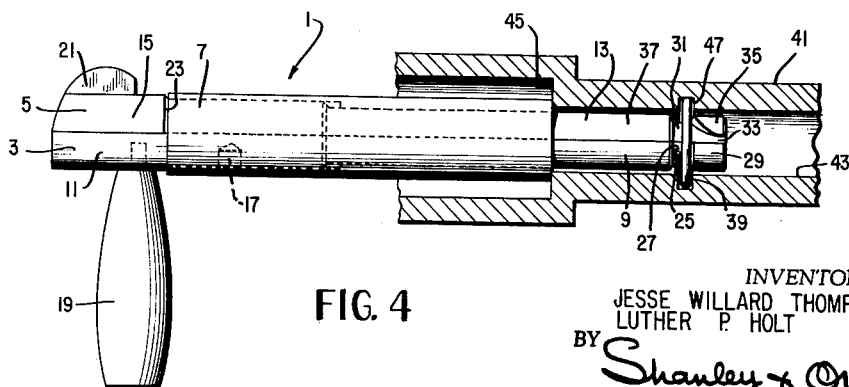
INVENTOR.
JESSE WILLARD THOMPSON
LUTHER P. HOLT
BY
Shanley & O'Neil
ATTORNEY April 27, 1965     J. W. THOMPSON ETAL     3,180,015
TOOL FOR INSERTING O-RINGS
Filed Jan. 3, 1963     2 Sheets-Sheet 2
FIG. 5
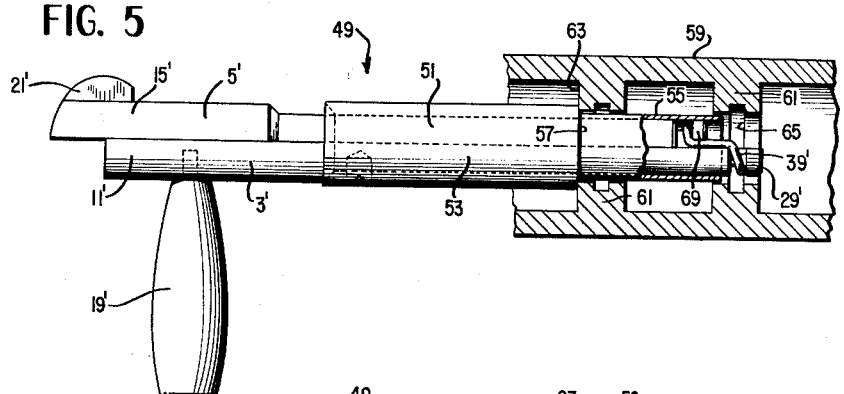
FIG. 6
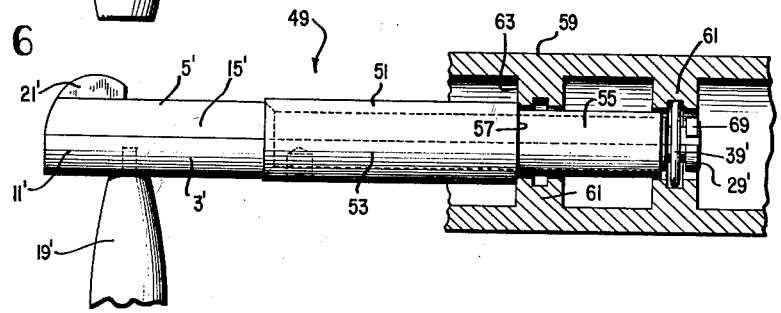
FIG. 7
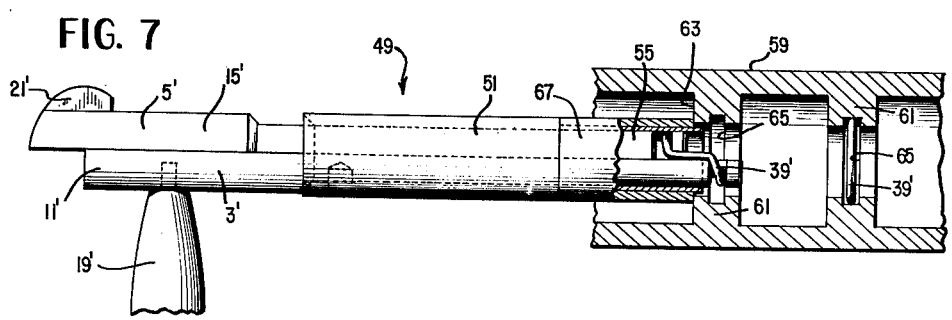
FIG. 8
INVENTORS.
JESSE WILLARD THOMPSON
LUTHER P. HOLT
BY Shanley & O'Neil
ATTORNEYS.

United States Patent Office 3,180,015
Patented Apr. 27, 1965

3,180,015
TOOL FOR INSERTING O-RINGS
Jesse Willard Thompson, 545 Mildred Ave., and Luther P. Holt, Monroe St., both of Trumann, Ark.
Filed Jan. 3, 1963, Ser. No. 249,227
9 Claims. (Cl. 29—235)

The present invention relates to tools for inserting O-rings in internal annular sockets.

O-rings are commonly provided in internal annular sockets for a variety of purposes, for example, for sealing a shaft in a cylindrical bore. The operation of inserting the O-rings, however, is often a difficult one by virtue of the fact that the external diameter of the O-ring is always substantially larger than the internal diameter of the bore. When the internal annular socket is sufficiently near the end of the bore, or when the internal diameter of the bore is sufficiently large, then the O-ring can be inserted by use of the fingers. But when the bore is too small, or the internal annular socket is too far from either end of the bore, then the insertion of the O-ring is quite difficult.

Accordingly, it is an object of the present invention to provide devices for inserting O-rings in internal annular sockets, more particularly in sockets in which the O-rings cannot be manually inserted.

Another object of the present invention is the provision of such devices that will be relatively simple and inexpensive to manufacture, quick and easy to operate, and rugged and durable in use.

Other objects and advantages of the present invention will become apparent from a consideration of the following description, taken in connection with the accompanying drawings, in which:

FIGURE 1 is an elevational view of a device according to the present invention, with an O-ring in place on its insertion end;

FIGURE 2 is a view similar to FIGURE 1 but showing the device in the position it is given during insertion;

FIGURE 3 is a view showing the device inserted to the proper depth in a shaft housing, but with the O-ring not yet seated in the socket;

FIGURE 4 is a view similar to FIGURE 3 but showing the device in the position it occupies to seat the O-ring fully in the recess;

FIGURE 5 is a view similar to FIGURE 3 but showing a modified form of the invention;

FIGURE 6 is a view similar to FIGURE 4 but showing the device of FIGURE 5;

FIGURE 7 is a view of the device of FIGURE 5 at the stage of operation of FIGURE 5 but showing an auxiliary sleeve in place for the purpose of seating an O-ring in another recess disposed a different depth within the bore; and FIGURE 8 is a view of the device of FIGURE 7 at the same stage of operation as FIGURE 6.

Referring now to the drawings in greater detail, and first to the device of FIGURES 1–4, there is shown a tool for inserting O-rings, indicated generally at 1, comprising first and second elongated members 3 and 5 mounted in a hollow elongated sleeve 7. Preferably, members 3 and 5 are generally semicylindrical, while at least the bore of sleeve 7 is generally cylindrical. Member 3 projects from both ends of sleeve 7 in an outer end 9 and an inner end 11, while member 5 extends beyond both ends of sleeve 7 in an outer end 13 and an inner end 15. A set screw 17 extends through sleeve 7 and fixedly but releasably secures member 3 against movement relative to sleeve 7, thereby to permit the use of sleeves of different lengths. Member 5, however, is free to slide in sleeve 7 on and relative to member 3.

A handle 19 is provided on inner end 11 of member 3, and a handle 21 is provided on inner end 15 of member 5. It is intended that the tool be grasped in the hand of the operator by holding handle 19, and that handle 21 serve as a finger piece for drawing member 5 from its rest or inoperative position as seen in FIGURE 1 to its operative or insertion position as seen in FIGURE 2, and for returning it to the position of FIGURE 1. A shoulder 23 marks what might be called the forward boundary of inner end 15 of member 5 and abuts against the rear end of sleeve 7 in the forwardmost position of member 5 as shown in FIGURE 1, thereby to limit forward movement of member 5 to movement into the position of FIGURE 1. In the position of FIGURE 1, therefore, the shoulder 23 and the rear end of sleeve 7 in engagement with each other provide an indicator for indicating the attainment of the position of FIGURE 1. Similarly, the disposition of the rearmost ends of inner ends 11 and 15 of members 3 and 5 flush with each other is another indicator that the parts are in the position of FIGURE 1.

Adjacent its outer end 9, member 3 is provided with a semicircular groove 25 the rear side of which is defined by a semicircular abutment shoulder 27. Groove 25 is formed by cutting into the material of member 3 so as to leave a projection of which abutment shoulder 27 is the endwise outer wall. On the other side of groove 25 is an enlarged portion 29 left by the cutting of groove 25 and bounded on its inner side by a semicircular annular abutment shoulder similar to shoulder 27.

When the parts are in the position of FIGURE 1, a semicircular groove 31 on the outer end 13 of member 5 registers with groove 25 and together with groove 25 completes an annular groove entirely about the assembly of members 3 and 5 at the outer ends thereof. Groove 31 differs from groove 25, however, in that it has forwardly projecting extensions 33 at each end thereof, so that the projection 35 that is endwise outward of groove 31 has rounded edges at its rear or inner side and is spaced on both sides from enlarged portion 29. To the rear of groove 31, the portion left by cutting away groove 31 comprises an enlarged portion 37 that terminates forwardly in a semicircular abutment shoulder which together with shoulder 27 completes an annular abutment shoulder about members 3 and 5.

The manner of operation of the device according to the embodiment of FIGURE 1 is best seen by serial consideration of FIGURES 1–4. FIGURE 1 shows the device in its starting position, in which an O-ring 39 is passed over the outer or insertable ends of members 3 and 5 and is disposed in grooves 25 and 31. The O-ring is pulled down into groove 31, and then, as is seen in FIGURE 2, handle 21 is grasped and moved to the left as seen in FIGURE 2, that is, to the rear, which causes O-ring 39 to assume the shape shown in FIGURE 2; that is, projection 35 draws the upper portion of the O-ring to the rear, while the lower portion of the O-ring is caught in groove 25 and cannot travel to the rear. As a result, the O-ring is drawn into grooves 25 and 31 with portions of the O-ring occupying extensions 33 of groove 31 between projection 35 and the projection that carries abutment shoulder 27. Thus, although O-ring 39 extends outside the contour of members 3 and 5 as seen in FIGURE 1, when the device is moved to the position of FIGURE 2, O-ring 39 is entirely within the contour of members 3 and 5.

In the position of FIGURE 2, therefore, the O-ring can then be inserted into a confined space to seat it in its socket. The first step of this operation is shown in FIGURE 3, in which the tool is shown in use to insert an O-ring 39 into a shaft housing 41 having a generally cylindrical bore 43 therethrough and terminating endwise outwardly in an abutment shoulder 43. The object of the operation illustrated in FIGURES 3 and 4 is to position O-ring 39 in an annular internal socket 47 in housing 41, socket 47 being so deep in bore 43 that the operation cannot easily be performed with the fingers.

The first steps of inserting the O-ring having been performed as seen in FIGURES 1 and 2, the outer ends 9 and 13 of members 3 and 5 are then inserted into bore 43 until the outer end of sleeve 7 contacts abutment shoulder 45 and stops the tool in the position shown in FIGURE 3. The length of sleeve 7 is so chosen that when the parts are in the position of FIGURE 3, groove 25 on outer end 9 of member 3 will register with socket 47. Member 5 is then moved forwardly deeper into bore 43 by manipulation of handle 21 until the parts resume the position of FIGURES 1 and 4, in which grooves 25 and 31 register with each other and with socket 47. The O-ring 39 thus resumes its outwardly sprung configuration and slips entirely into socket 47. O-ring 39 cannot become misplaced during this operation, for it is always entirely within grooves 25 and 31 and extensions 33 of groove 31. The contact of shoulder 23 with the rear end of sleeve 7, or the flush relationship of the very rear ends of members 3 and 5, or both, indicate that the inserted ends of members 3 and 5 have reached the position of FIGURE 4 and that accordingly the O-ring is fully seated in socket 47. Tool 1 may then be withdrawn from shaft housing 41 the reverse of the way it went in.

In the form of the invention shown in FIGURES 5-8, in which the primed reference characters indicate the same parts as in FIGURES 1-4, there is provided a tool generally indicated at 49 which in most respects is identical to tool 1 except that the sleeve 51 is comprised of a rear portion 53 of relatively large external diameter and a forward portion 55 of relatively small external diameter. Forward portion 55 extends toward the insertable ends of members 3' and 5' a greater distance than did sleeve 7. The intersection of sleeve portions 53 and 55 is thus marked by an annular abutment shoulder 57 on sleeve portion 53 that faces in the direction of insertion of the tool.

The tool of FIGURES 1-4 was designed to insert O-rings all at a constant depth in the bore, by engagement between the outer end of sleeve 7 and the corresponding abutment shoulder on the shaft housing. The embodiment of FIGURES 5-8, however, is designed to insert O-rings at different depths in the same bore or in different bores. There is illustrated by way of example a shaft housing 59 having a plurality of axially-spaced annular seats 61 the outermost of which provides on its outer face an abutment shoulder 63. Each annular seat 61 is characterized by an annular internal socket 65 in which it is desired to place an O-ring so as to seal against the shaft subsequently to be inserted.

To achieve this multiple insertion, the tool is used according to the sequence of events shown serially in FIGURES 5-8. In FIGURE 5, an O-ring which has previously been placed on the tool in the manner of FIGURE 1 is shown being inserted in the innermost socket 65 of shaft housing 59. In this position of insertion, abutment shoulder 57 on the tool abuts against abutment shoulder 63 on the shaft housing accurately to locate the grooves in the insertable ends in registry with that innermost annular seat 61. FIGURE 6 shows the completion of the insertion operation, corresponding to FIGURE 4 in connection with the preceding embodiment, after which the tool is retracted to the left as seen in FIGURE 6.

To adapt the tool to insert an O-ring in the left-hand socket 65 as seen in FIGURES 5-8, a removable sleeve 67 is slipped over forward portion 55 of sleeve 51. Sleeve 67 has an external diameter about the same as that of rear portion 53 of sleeve 51 and has an internal diameter only a little greater than the external diameter of forward sleeve portions 55. The net effect of the addition of sleeve 67 is to move abutment shoulder 57 to the right as seen in the drawings.

With member 5' in its forwardmost position, a further O-ring is added to the insertable end of the tool in a manner similar to FIGURE 1, and member 5' is drawn to the rear in a manner similar to FIGURE 2, whereupon tool 49 is again inserted. But sleeve 67 is of a length equal to the distance between the two axially-spaced O-ring in housing 59, so that sleeve 67 abuts against abutment shoulder 63, thereby locating the grooves in the insertable ends of members 3' and 5' in registry with that left-hand internal socket 65. Upon advancing member 5' to the right as seen in FIGURE 7, the O-ring seats as is seen in FIGURE 8, after which the tool is removed. Of course, it will be understood that sleeves 67 of a variety of axial lengths can be provided so as to adapt a tool according to the present invention to the insertion of O-rings at any desired depth, or to insert any desired number of O-rings at any required spacing.

As was noted above, the principal difference between the embodiments of FIGURES 1-4 and FIGURES 5-8 is the presence of sleeve 67. Although it is preferred that sleeve 67 ride on a reduced forward portion of the main sleeve, such as portion 55 in FIGURE 5, it is not necessary that sleeve 67 ride on anything other than members 3' and 5'.

Sleeve 51 is not necessarily the only difference between the embodiments of FIGURES 1-4 and 5-8. In FIGURE 8, a modified form of projection in the form of projection 69 is provided in place of projection 35. Projection 69 has sharp end edges rather than smoothly rounded ends; but this makes but little difference so long as space is left between those portions of members 3' and 5' that confine between them the O-rings when member 5' is pulled back. Needless to say, this spacing could be achieved not only by making projections 35 or 69 terminate short of the corresponding enlargement 29 of member 3, as is shown in the drawings, but also by removing a portion of the projection which carries abutment shoulder 27. In other words, projection 35 could extend a full half circle if abutment shoulder 27 were cut away at its peripheral ends for a considerable distance axially of the elongated members 3 and 5 or 3' and 5'.

From a consideration of the foregoing disclosure, therefore, it will be obvious that all of the initially recited objects of this invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A device for inserting O-rings in internal annular sockets, comprising a pair of elongated members, means maintaining the members in assembly with each other for lengthwise movement relative to each other, said members having adjacent ends insertable in an internal socket, each said member adjacent its insertable end having a projection extending away from the other said member, a first member of said members extending a substantial distance endwise beyond its said projection, and said members being movable lengthwise relative to each other between a first position in which the projection of the second member of said members is disposed endwise beyond the projection of said first member and a second position in which the projection of said first member is disposed endwise beyond the projection of said second member.

2. A device as claimed in claim 1, said means comprising a sleeve, one of said members being fixed relative to the sleeve and the other of said members being slidable lengthwise in the sleeve.

3. A device as claimed in claim 2, said other member extending beyond both ends of the sleeve.

4. A device as claimed in claim 3, and handle means on one end of said other member on its end opposite said insertable end.

5. A device as claimed in claim 2, and means releasably securing said one member in the sleeve to permit the use of sleeves of different lengths relative to each other.

6. A device as claimed in claim 2, the sleeve having an abutment thereon facing said insertable ends of the members, and a removable sleeve disposed against the abutment as an endwise extension of the first-named sleeve.

7. A device as claimed in claim 1, the projection of said first member having an endwise outer face that extends about halfway around the pair of members, the other of the projections having an endwise inner face that extends substantially less than halfway around the pair of members and is spaced a substantial distance from said endwise outer face in all positions of said members relative to each other.

8. A device as claimed in claim 1, and indicator means for designating when the members are so positioned relative to each other that the projection of said other member is disposed a short distance endwise beyond the projection of said one member.

9. A device as claimed in claim 1, each of said members having a recess opening away from the other member and adjacent but spaced inwardly from the outer end of each said member, said projection of said one member comprising the endwise inner wall of said recess of said one member, said projection of said other member comprising the endwise outer wall of said recess of said other member.

References Cited by the Examiner
UNITED STATES PATENTS

| | | | |
|---|---|---|---|
| 2,422,549 | 6/47 | Hogin | 29—235 |
| 2,468,286 | 4/49 | Behlert | 29—235 |
| 2,947,074 | 8/60 | Newman | 29—280 |

WILLIAM FELDMAN, *Primary Examiner.*